US009413661B2

(12) United States Patent
Yasuda (10) Patent No.: US 9,413,661 B2
(45) Date of Patent: Aug. 9, 2016

(54) NETWORK RELAY DEVICE (71) Applicant: Hitachi Metals, Ltd., Minato-ku, Tokyo (JP)

(72) Inventor: Makoto Yasuda, Tsuchiura (JP)

(73) Assignee: Hitachi Metals, Ltd., Tokyo (JP)

( * ) Notice: Subject to any disclaimer, the term of this patent is extended or adjusted under 35 U.S.C. 154(b) by 46 days.

(21) Appl. No.: 14/171,246

(22) Filed: Feb. 3, 2014

(65) Prior Publication Data
US 2014/0294008 A1    Oct. 2, 2014

(30) Foreign Application Priority Data

Mar. 28, 2013    (JP) .................................. 2013-070194

(51) Int. Cl.
H04L 12/743    (2013.01)
(52) U.S. Cl.
CPC .................................. H04L 45/7453 (2013.01)
(58) Field of Classification Search
CPC ....... H04L 45/72; H04L 45/74; H04L 45/745;
H04L 45/7453; H04L 9/06; H04L 9/0643;
H04L 9/3223; H04L 9/3242
USPC .............. 370/389, 392, 325, 395.53; 709/249
See application file for complete search history.

(56) References Cited

U.S. PATENT DOCUMENTS

| 5,396,493 | A | 3/1995 | Sugiyama | |
| 7,352,753 | B2 * | 4/2008 | Glad | H04L 47/10 370/395.53 |
| 7,873,041 | B2 * | 1/2011 | Lee | G06F 17/30949 370/389 |
| 2002/0169937 | A1 * | 11/2002 | Kagawa | G06F 17/30949 711/206 |
| 2004/0068589 | A1 * | 4/2004 | Witkowski | H04L 12/467 709/249 |
| 2010/0316053 | A1 * | 12/2010 | Miyoshi | H04L 45/00 370/392 |
| 2011/0002336 | A1 | 1/2011 | Saeki | |
| 2011/0058474 | A1 * | 3/2011 | Nagapudi et al. | 370/235 |
| 2011/0128959 | A1 * | 6/2011 | Bando | H04L 45/745 370/392 |

FOREIGN PATENT DOCUMENTS

| JP | 4-237232 A | 8/1992 |
| JP | 6-224918 A | 8/1994 |
| JP | 2002-334114 A | 11/2002 |
| JP | 2011-229093 A | 11/2011 |
| JP | 2011-257788 A | 12/2011 |
| WO | WO 2009/110445 A1 | 9/2009 |

OTHER PUBLICATIONS

Japanese-language Office Action issued in counterpart Japanese Application No. 2013-07019 dated Feb. 23, 2016 with English translation (6 pages).

* cited by examiner

Primary Examiner — Kwang B Yao
Assistant Examiner — Syed M Bokhari
(74) Attorney, Agent, or Firm — Crowell & Moring LLP (57) ABSTRACT A network relay device capable of easily recognizing a state of hash value collision is provided. Each of a plurality of entries contained in an address table includes: a first area in which first information is registered, the first information indicating a relation between a plurality of ports and MAC addresses existing beyond the plurality of ports; and a second area in which second information is registered. In learning a transmission-source MAC address of a frame received at a port, a frame processing unit calculates a hash value by using the transmission-source MAC address first. Next, if a MAC address different from the transmission-source MAC address has been registered in the first area of an entry corresponding to the hash value, the frame processing unit registers the second information in the second area.

4 Claims, 9 Drawing Sheets

FDB2

| Hash VALUE (ENTRY) | MAC ADDRESS (Key) | PORT (result) | COLLISION HISTORY (2b') |
|---|---|---|---|
| 0~122 | - | - | 00 |
| 123 | BB→DD→EE | P2→P4→P5 | 10 |
| 124~455 | - | - | 00 |
| 456 | AA | P1 | 00 |
| 457~788 | - | - | 00 |
| 789 | CC | P3 | 00 |
| 790~1023 | - | - | 00 |

FDB3

| Hash VALUE (ENTRY) | MAC ADDRESS (Key) | PORT (result) | ... | MAC ADDRESS (Key) | PORT (result) | COLLISION HISTORY (2b') |
|---|---|---|---|---|---|---|
| 0~122 | – | – | ... | – | – | 0 |
| 123 | BB→GG | P2→P7 | ... | EE | P5 | 1 |
| 124~455 | – | – | ... | – | – | 0 |
| 456 | AA | P1 | ... | DD | P4 | 0 |
| 457~788 | – | – | ... | – | – | 0 |
| 789 | CC | P3 | ... | FF | P6 | 0 |
| 790~1023 | – | – | ... | – | – | 0 |

| Hash VALUE (ENTRY) | MAC ADDRESS (Key) | PORT (result) | OVERWRITING HISTORY (2b') | ... | MAC ADDRESS (Key) | PORT (result) | REWRITING HISTORY (2b') |
|---|---|---|---|---|---|---|---|
| 0~122 | - | - | 0 | ... | - | - | 0 |
| 123 | BB→GG | P2→P7 | 1 | ... | EE | P5 | 0 |
| 124~455 | - | - | 0 | ... | - | - | 0 |
| 456 | AA | P1 | 0 | ... | DD | P4 | 0 |
| 457~788 | - | - | 0 | ... | - | - | 0 |
| 789 | CC | P3 | 0 | ... | FF | P6 | 0 |
| 790~1023 | - | - | 0 | ... | - | - | 0 |

FDB4, AR1[1], AR2[1], AR1[k], AR2[k]

FIG. 10A

FDB'

| Hash VALUE (ENTRY) | MAC ADDRESS (Key) | PORT (result) |
|---|---|---|
| 0~122 | - | - |
| 123 | BB→DD | P2→P4 |
| 124~455 | - | - |
| 456 | AA | P1 |
| 457~788 | - | - |
| 789 | CC | P3 |
| 790~1023 | - | - |

FIG. 10B

TOTAL AGGREGATION OF Key
(ex. 60 bit SPACE)

TOTAL AGGREGATION OF Hash
(ex. 10 bit SPACE)

NETWORK RELAY DEVICE

CROSS-REFERENCE TO RELATED APPLICATION

The present application claims priority from Japanese Patent Application No. 2013-070194 filed on Mar. 28, 2013, the content of which is hereby incorporated by reference into this application.

TECHNICAL FIELD OF THE INVENTION

The present invention relates to a network relay device, and, for example, to a network relay device including an address table controlled with a hash value.

BACKGROUND OF THE INVENTION

International Publication No. WO2009/110445 (Patent Document 1) and Japanese Patent Application Laid-Open Publication No. 2011-229093 (Patent Document 2) describe a method of processing a packet by using two tables. In one table, information such as an IP address is controlled with a hash value. In the other table, information such as an IP address is controlled by using a CAM. When a collision of a hash value is caused in registering the information such as the IP address, the information such as the IP address is registered in the table using the CAM.

Also, Japanese Patent Application Laid-Open Publication No. 2002-334114 (Patent Document 3) describes a method of dividing a MAC address table into a plurality of banks in order to reduce a probability of occurrence of rehash so that entry of each of the banks is simultaneously accessed by using a hash value of a MAC address as an address. Each entry contains an address bit (one bit) indicating an access history and a valid bit (one bit) indicating whether the entry is valid/invalid. When all valid bits of the respective entries corresponding to a certain hash value indicate valid, there is no vacant entry, and therefore, rehash for changing a hash function so as to perform the registration again is performed.

SUMMARY OF THE INVENTION

For example, a switch device (a network relay device) performing a processing at the Layer 2 (L2) level of the communication standard includes an address table indicating a relation or others between a port and a MAC (Media Access Control) address of a terminal or others existing beyond each port, and others. The address table is also called FDB (Forwarding DataBase) or others. When the switch device receives a frame at a port, the switch device determines a port corresponding to a destination address contained in the frame based on the address table, and relays the received frame to the determined port.

In such a switch device, if the number of the terminals or others connected to the switch device is increased, a large-scale address table is required in accordance with this increase, and therefore, a cost of the address table configured of a storage device is increased, and besides, time for searching the address table is lengthened. Thus, as described in the Patent Documents 1 to 3, a method of managing the address table with a hash value is beneficial. However, when this method is used, such a so-called hash value collision that the same hash value is calculated for the different MAC addresses is caused in some cases.

In order to make a relay operation of the switch device more efficient, it is beneficial to recognize a state of this hash value collision. Specifically, it is beneficial to recognize information indicating at what ratio the hash value collision with respect to all entries in the address table is caused or at which entry the hash value collision is caused. It is not easy to recognize such information when the techniques as described in the Patent Documents 1 to 3 are used.

The present invention has been made in view of such circumstances, and a preferred aim of the present invention is to provide a network relay device capable of easily recognizing the state of the hash value collision. The above and other preferred aims and novel characteristics of the present invention will be apparent from the description of the present specification and the accompanying drawings.

The summary of the typical embodiment of the inventions disclosed in the present application will be briefly described as follows.

A network relay device according to the present embodiment includes: a plurality of ports; an address table having a plurality of entries; and a frame processing unit for relaying a frame among the plurality of ports based on the address table. Here, each of the plurality of entries includes: a first area where first information is registered, the first information indicating a relation between the plurality of ports and MAC addresses existing beyond the plurality of ports; and a second area where second information is registered. Also, in learning a transmission-source MAC address of a frame received at any of the plurality of ports, the frame processing unit calculates a hash value by using the transmission-source MAC address first. Then, the frame processing unit registers the second information in the second area if a MAC address different from the transmission-source MAC address has been registered in the first area of an entry corresponding to the hash value.

When the effects obtained by the typical embodiment of the present inventions disclosed in the present application is briefly described, the state of the hash value collision in the network relay device can be easily recognized.

DESCRIPTIONS OF THE PREFERRED EMBODIMENTS

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof. Also, in the embodiments described below, when referring to the number of elements (including number of pieces, values, amount, range, and others), the number of the elements is not limited to a specific number unless otherwise stated or except the case where the number is apparently limited to a specific number in principle. The number larger or smaller than the specified number is also applicable.

Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and others are mentioned, the substantially approximate and similar shapes and others are included therein unless otherwise stated or except the case where it is conceivable that they are apparently excluded in principle. The same goes for the numerical value and the range described above.

Hereinafter, embodiments of the present invention will be described in detail based on the accompanying drawings. Note that the same components are denoted by the same reference symbols throughout the drawings for describing the embodiments, and the repetitive description thereof will be omitted.

First Embodiment

Outline of Communication System and Network Relay Device

Figure 1A:
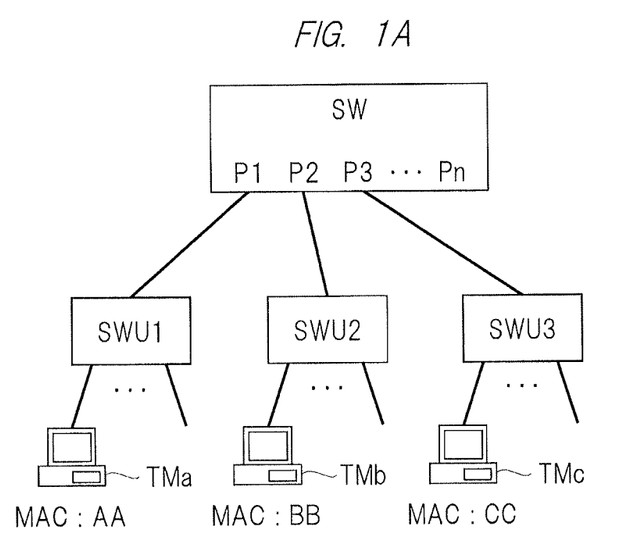
FIG. 1A is a schematic diagram illustrating a structure example of a communication system to which a network relay device according to a first embodiment of the present invention is applied.
Figure 1B:
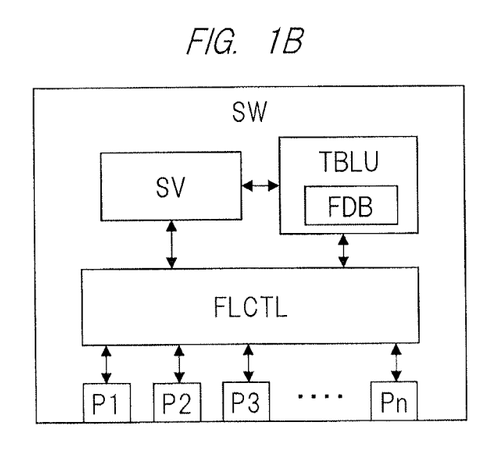
FIG. 1B is a block diagram illustrating a schematic structure example of the network relay device in FIG. 1A.

FIG. 1A is a schematic diagram of a structure example of a communication system to which a network relay device according to a first embodiment of the present invention is applied, and FIG. 1B is a block diagram of a schematic structure example of the network relay device in FIG. 1A. The communication system illustrated in FIG. 1A includes: a switch device (a network relay device) SW having a plurality of ports P1, P2, P3, . . . , Pn; and a plurality of user switch devices SWU1, SWU2, and SWU3 connected to the ports P1, P2, and P3 via a communication line, respectively. To the user switch devices SWU1, SWU2, and SWU3, terminals TMa, TMb, and TMc are connected via a communication line, respectively.

For example, the switch device SW has a chassis-type structure, and the user switch devices SWU1, SWU2, and SWU3 each has a box-type structure, although not particularly limited thereto. Each of the user switch devices SWU1, SWU2, and SWU3 relays a frame to/from the terminal connected to itself, and the switch device SW relays a frame to/from the user switch devices SWU1, SWU2, and SWU3. For example, when the frame is transferred from the terminal TMa to the terminal TMc, the frame is transferred in such a route as "TMa→SWU1→SW→ZWU3→TMc". Also, for example, the switch device SW can set a VLAN (Virtual Local Area Network) or others to the plurality of ports P1, P2, P3, . . . , Pn.

As illustrated in FIG. 1B, the switch device (network relay device) SW includes: a plurality of ports P1, P2, P3, . . . , and Pn; a frame processing unit FLCTL; a table unit TBLU; and a managing unit SV. The table unit TBLU is configured of a storage device including an address table FDB managed with a hash value although described in detail later. The frame processing unit FLCTL relays a frame to/from the plurality of ports based on the address table FDB. The managing unit SV is constructed of a hardware such as an FPGA (Field Programmable Gate Array) or a program processing performed by a CPU (Central Processing Unit) or others, although not particularly limited thereto, and has, for example, a function of analyzing information in the address table FDB in accordance with a request from a user although described in detail later.

Note that FIG. 1B illustrates the entire structure of the switch device SW. However, for example, if the switch device SW is of the chassis type, the switch device is mounted on one package so that a plurality of line cards connected to each other via a backplane have such a configuration as illustrated in FIG. 1B. However, the managing unit SV may be provided not on each line card but on a management card connected to the plurality of line cards via the backplane. Also, the switch devices SWU1, SWU2, and SWU3 have a structure similar to that of FIG. 1B. However, for the user switch devices, it is not normally required to recognize many terminals because of setting of the VLAN, and therefore, it is not required to manage the address table with the hash value. Furthermore, such a structure example that the user switch devices are connected to the ports of the switch device SW of has been described here. However, of course, such a structure that the terminals are directly connected to the ports may be adopted.

Figure 10A:
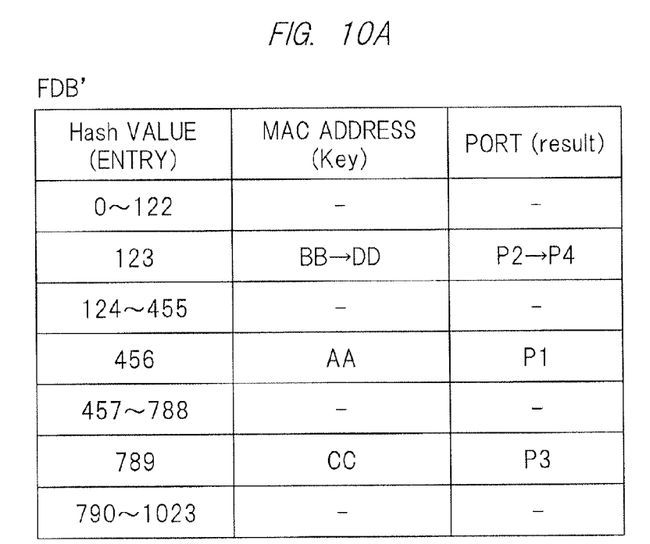
FIG. 10A is a schematic diagram illustrating a structure example of an address table of a network relay device studied as premise of the present invention.
Figure 10B:
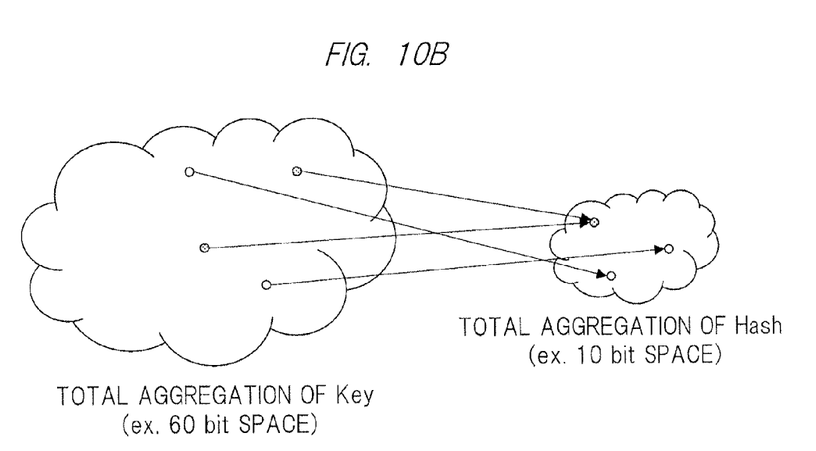
FIG. 10B is a conceptual diagram illustrating one example of a method of managing the address table of FIG. 10A.

Structure of Address Table (Comparative Example) and Management Method Thereof FIG. 10A is a schematic diagram illustrating a structure example of an address table of a network relay device studied as a premise of the present invention, and FIG. 10B is a conceptual diagram illustrating one example of a method of managing the address table of FIG. 10A. An address table FDB' illustrated in FIG. 10A contains a plurality of (in this example, 1024) entries corresponding to hash values, and a MAC address and a port are registered in each entry. For example, in an entry corresponding to a hash value of 456, information indicating the port P1 and the existence of a terminal whose MAC address is "AA" beyond the port P1 is registered.

The hash value is a value obtained by a computation based on a hash function with taking such information as being called "Key" as input as illustrated in FIG. 10B. As the hash function, such a function as reducing information volume of the "Key" is used. Although not particularly limited, the hash function converts, for example, a space of the "Key" of 60 bits into a space of 10 bits (that is, 0 to 1023 in the decimal number). Here, "Key" is set to, for example, a bit string formed of a MAC address (of 48 bits) in FIG. 10A and an identifier (of 12 bits) of the VLAN to which the MAC address belongs, whose illustration is omitted. In the example of FIG.

10A, the computation based on the hash function is performed by taking, for example, the MAC address "AA" (and besides, the identifier of its VLAN) as the "Key" (that is, the input), so that the hash value of 456 is obtained.

By using such a hash function, the information volume is reduced, so that a storage capacity required for the address table can be reduced. However, as a side effect, as illustrated in FIG. 10B, the same hash value is obtained from different pieces of the "Key" in some cases. Such a state is referred to as hash value collision or others. For example, as a premise in the example of FIG. 10A, a MAC address "BB" and the port P2 have already been registered in an entry corresponding to a hash value of 123. A case is illustrated so that, in this condition, the switch device receives a frame whose transmission-source address is a MAC address "DD" at the port P4, and the hash value based on the MAC address DD (and besides, the identifier of its VLAN) is 123 as well. In this case, in the example of FIG. 10A, this new information is overwritten and registered in the entry corresponding to the hash value of 123.

As the hash function, a function which is difficult to cause the hash value collision is normally used. However, for example, in the switch device SW required to recognize many terminals as illustrated in FIGS. 1A and 1B, the hash value collision is caused at a certain probability in some cases. In order to make the relay operation of the switch device more efficient, it is beneficial to recognize the state of this hash value collision. However, in the address table FDB' of FIG. 10A, it is difficult to recognize this state of the collision.

Structure of Address Table (in Present Embodiment)

Figure 2:
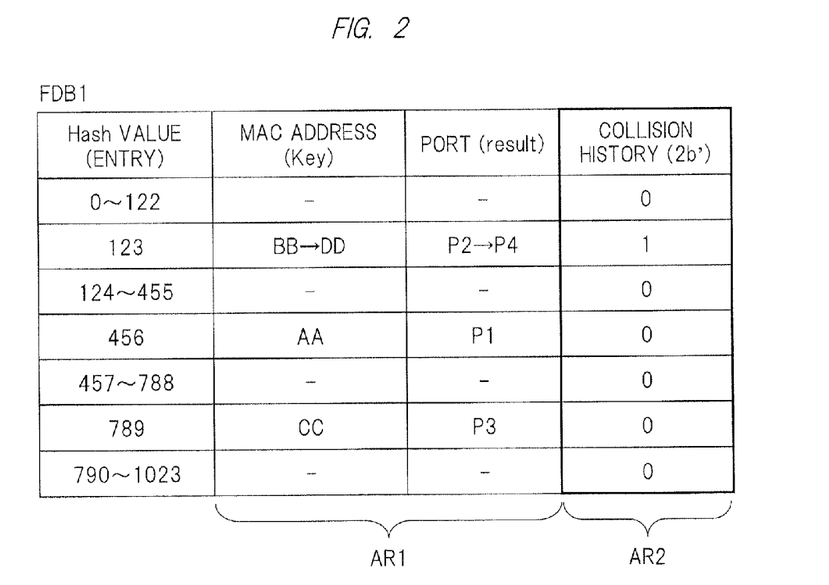
FIG. 2 is a schematic diagram illustrating a structure example of an address table of the network relay device of FIG. 1B.

FIG. 2 is a schematic diagram of a structure example of the address table of the network relay device of FIG. 1B. An address table FDB1 illustrated in FIG. 2 contains a plurality of (in this example, 1024) entries corresponding to hash values. The hash values may be memory address of storage devices configuring the address table FDB1. Each entry includes: a first area AR1 in which the first information indicating a relation between the plurality of ports P1, P2, P3, . . . , Pn and the MAC addresses existing beyond the plurality of ports is registered; and a second area AR2 in which the second information is registered if the hash values collision is caused in the entry itself. The second information indicates a hash value collision history in the entry itself. As described above, the address table FDB1 of FIG. 2 has a structure into which the second area AR2 is added, compared with the address table FDB' illustrated in FIG. 10A.

For example, in the example of the address table FDB1 of FIG. 2, the second information in the second area AR2 indicates "1" of one bit. That is, in the second area AR2, "0" is registered if the hash value collision has not been caused in the corresponding entry, and "1" (the second information) is registered if the hash value collision has been caused. For example, as similar to the case of FIG. 10A, if the hash value collision is caused in accordance with the learning of the MAC address DD, in an entry corresponding to the hash value of 123 in which the MAC address BB and the port P2 have already been registered, "1" is registered in the second area AR2.

Also in this example, in the first area AR1 of the entry corresponding to the hash value of 123, the new MAC address DD and its corresponding port P4 have been overwritten and registered. However, in this learning, for example, if the first information in the first area AR1 has an attribute of priority, the overwriting and registration may not be performed. That is, if the first information already registered has a higher priority than the new first information, the overwriting and registration may not be performed in the first area AR1, and "1" is registered in the second area AR2 in some cases.

By using such an address table FDB1, the state of the hash value collision can be easily recognized. Specifically, for example, by extracting the entry having the second area AR2 in which the second information of "1" is registered, it can be recognized at which entry the hash value collision is caused. Also, by calculating a ratio of entries having the second area AR2 in which the second information of "1" is registered from among all entries (whose hash values are 0 to 1023) in the address table FDB1, it can be recognized at which ratio the hash value collision is caused with respect to all entries.

Operation of Principal Part of Frame Processing Unit

Figure 3:
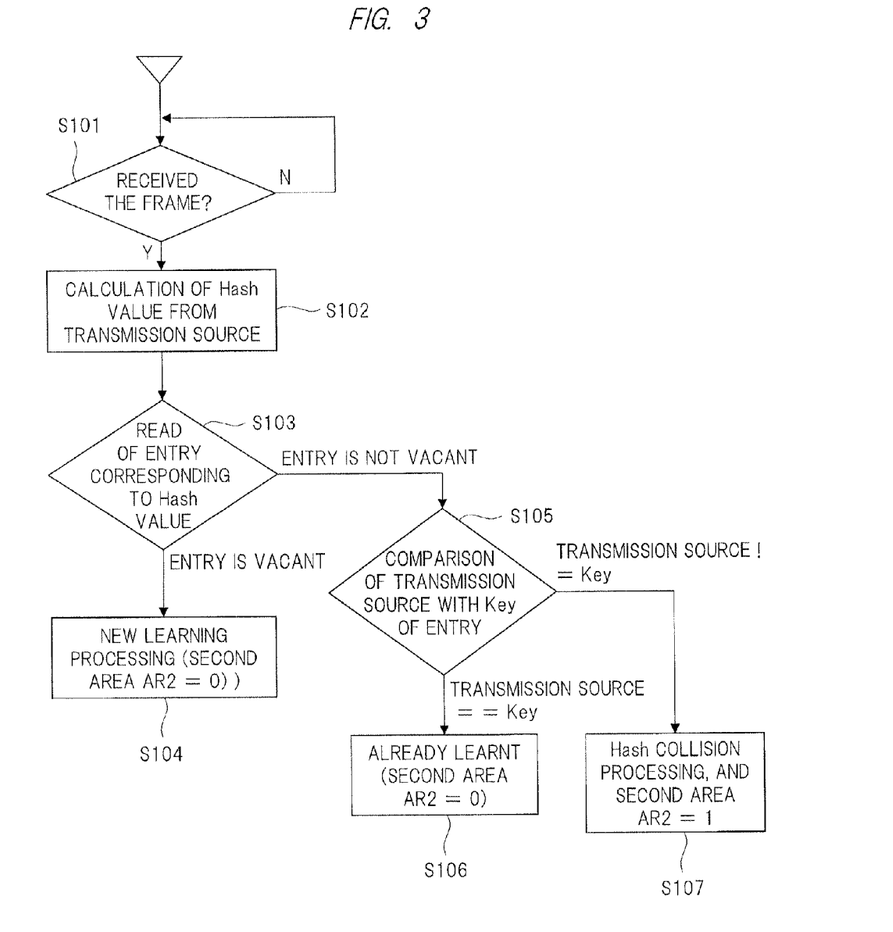
FIG. 3 is a flowchart illustrating an operation example of a principal part of a frame processing unit of the network relay device of FIG. 1B.

FIG. 3 is a flowchart illustrating an operation example of a principal part of a frame processing unit of the network relay device of FIG. 1B. FIG. 3 illustrates the operation example of the frame processing unit FLCTL in leaning the transmission-source MAC address. First, the frame processing unit FLCTL receives a frame at any of the plurality of ports P1, P2, P3, . . . , Pn (step S101). Next, in order to learn the transmission-source MAC address contained in the frame, the frame processing unit FLCTL calculates a hash value by using the transmission-source MAC address (step S102). Practically, in calculating the hash value, note that, for example, an identifier of a VLAN corresponding to the MAC address in addition to the transmission-source MAC address is also used.

Subsequently, the frame processing unit FLCTL reads an entry corresponding to the hash value obtained at step S102 from the address table FDB1 as illustrated in FIG. 2 (step S103). As a result, if the entry is vacant (that is, the first information has not been registered in the first area AR1), the frame processing unit FLCTL newly registers the first information obtained at the steps S101 and S102 in the first area AR1 of that entry (step S104). That is, as the first information, it registers a relation between the port which has received the frame at the step S101 and the transmission-source MAC address (in other words, a MAC address existing beyond that port) contained in the frame. Also, at this step S104, the frame processing unit FLCTL registers "0" in the second area AR2 of this entry.

On the other hand, if the entry is not vacant (that is, first information has been already registered in the first area AR1) at step S103, the frame processing unit FLCTL compares the transmission-source MAC address at step S102 and the MAC address (Key) which has already been registered in this entry (step S105). Here, if the transmission-source MAC address and the already-registered MAC address match each other, the transmission-source MAC address has already been learnt, and therefore, the frame processing unit FLCTL does not perform any particular processing, and "0" is maintained in the second area AR2 of the address table FDB1 (step S106).

On the other hand, when the transmission-source MAC address and the already-registered MAC address do not match each other at step S105, the frame processing unit FLCTL performs a predetermined collision processing (step S107). Specifically, the frame processing unit FLCTL overwrites the first information obtained at steps S101 and S102 in the first area AR1 of this entry, or leaves the already-registered first information as described with reference to FIG. 2 in some cases. If the first information is overwritten and registered, it registers the relation between the port which has received the frame at step S101 and the transmission-source MAC address (in other words, the MAC address existing beyond the port) contained in the frame. Furthermore, at this step S107, the frame processing unit FLCTL registers the second information of "1" indicating the hash value collision history in the second area AR2 of this entry.

As described above, the frame processing unit FLCTL calculates the hash value by using the transmission-source MAC address, and registers the second information of "1" in the second area AR2 if a MAC address different from the transmission-source MAC address has been registered in the first area AR1 of the entry corresponding to the hash value. Although not illustrated in the drawings, also in searching for a destination MAC address of the received frame, note that the frame processing unit FLCTL similarly calculates a hash value from the destination MAC address or others, and reads an entry corresponding to the hash value. Then, if the MAC address already registered in this entry and the destination MAC address match each other, the frame processing unit FLCTL relays the frame to the port registered in this entry. If these MAC addresses do not match each other, the frame processing unit FLCTL performs flooding.

Operation of Managing Unit

Figure 4:
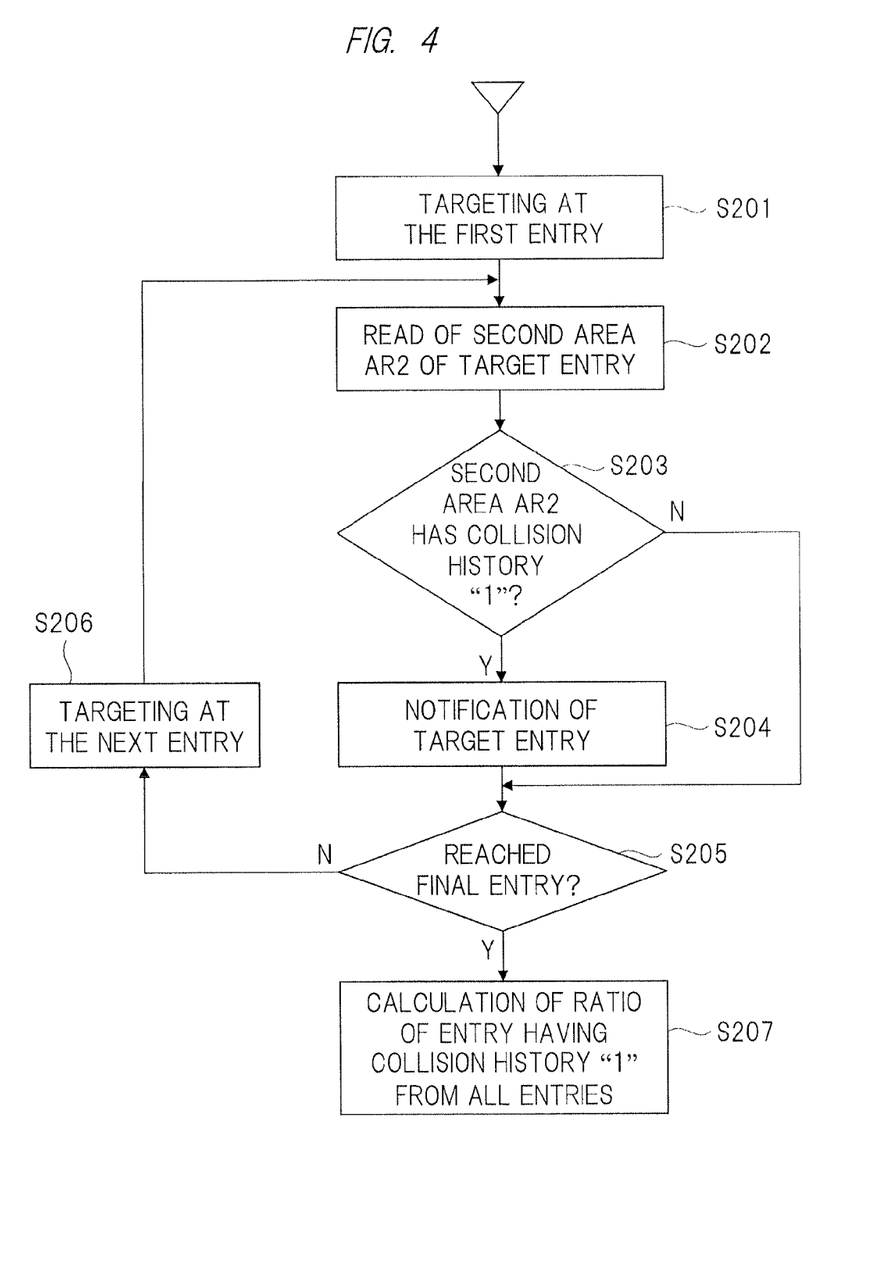
FIG. 4 is a flowchart illustrating an operation example of a managing unit of the network relay device of FIG. 1B.
Figure 5:
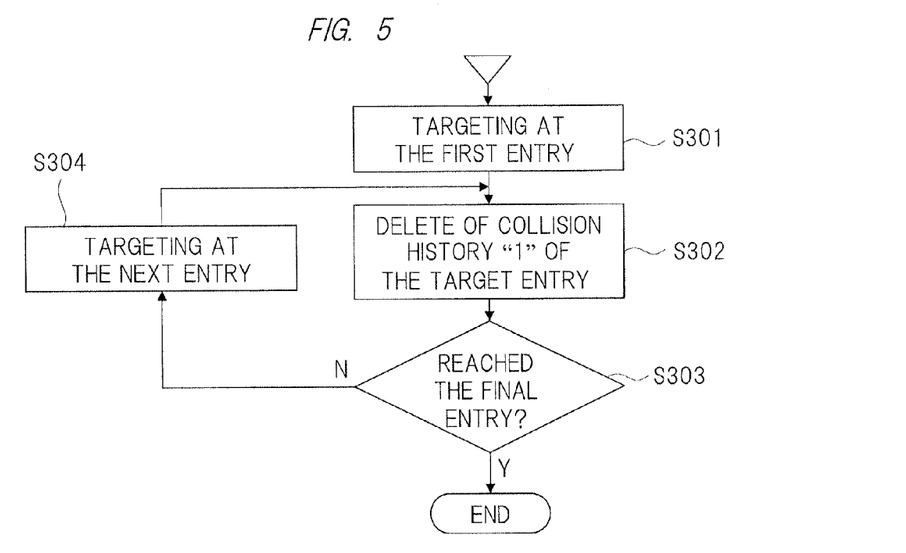
FIG. 5 is a flowchart illustrating another operation example of the managing unit of the network relay device of FIG. 1B.

FIG. 4 is a flowchart of an operation example of a managing unit of the network relay device of FIG. 1B. FIG. 5 is a flowchart illustrating another operation example of the managing unit of the network relay device of FIG. 1B. The processing of the managing unit SV illustrated in FIGS. 4 and 5 is executed in accordance with, for example, a request from a user. Although not particularly limited, specifically, the switch device SW of FIG. 1B includes, for example, a dedicated port for management separately. In a state that a management terminal is connected to the dedicated port, the user issues a request to the switch device SW by using the management terminal, and the switch device SW responds to the request. Also, as another method, the switch device SW includes, for example, so-called in-band management function. In a state that the management terminal is connected to a point existing beyond any of the plurality of ports P1 to Pn, the user issues a request to the switch device SW by using the management terminal, and the switch device SW responds to the request.

In accordance with such a request from the user, as illustrated in FIG. 4, the managing unit SV targets the initial entry (for example, 0) in the address table FDB1 first (step S201). Next, the managing unit SV reads the second area AR2 of the target entry (step S202), and determines whether or not the second information of "1" indicating the hash value collision history has been registered in the second area AR2 (step S203). If the second information of "1" has been registered in the second area AR2, the managing unit SV notifies the user of the target entry (step S204), and then, proceeds to step S205. On the other hand, if the second information of "1" has not been registered in the second area AR2, the managing unit SV proceeds directly to step S205.

At step S205, the managing unit SV determines whether or not the targeting has reached the last entry (for example, 1023). If the targeting has not reached yet, the managing unit SV targets a next entry (for example, an entry obtained by incrementing the target entry (by +1)), and then, returns to step S202 (step S206). On the other hand, if the targeting has reached the last entry, the managing unit SV calculates the ratio of entries each having the second area AR2 in which the second information of "1" has been registered from among all entries (for example, 0 to 1023), and notifies the user of the calculated ratio (step S207).

Also, in FIG. 5, the managing unit SV targets the initial entry (for example, 0) in the address table FDB1 first (step S301). Next, the managing unit SV registers "0" in the second area AR2 of the target entry so as to delete the second information of "1" indicating the hash value collision history if the second information of "1" has been registered therein (step S302). Then, the managing unit SV determines whether or not the targeting has reached the last entry (for example, 1023) (step S303). If the targeting has not reached yet, the managing unit SV targets the next entry (for example, an entry obtained by incrementing the target entry (by +1)), and then, returns to step S302 (step S304). For example, by such a processing, the hash value collision history is deleted in all entries.

By the processing as illustrated in FIG. 4, the user can easily recognize such information as indicating at what ratio the hash value collision is caused with respect to all entries in the address table or at which entry the hash value collision is caused. At this time, the processing as illustrated in FIG. 4 is executed while appropriately deleting the hash value collision history by using the processing as illustrated in FIG. 5, so that the tendency of the hash value collision can be also recognized on the time series.

Once the state of the hash value collision can be easily recognized as described above, the user or others can perform beneficial network management by reflecting this state. For example, if the ratio of the hash value collision is high, the user can perform such maintenance as moving one/some terminals to another network. Alternatively, the user can perform such maintenance as specifying a terminal corresponding to the entry in which the hash value collision is caused and limiting a communication band of that terminal or appropriately replacing the terminal between networks. By this management, the relay operation of the switch device (network relay device) can be more efficient.

As described above, by using the network relay device of the first embodiment, typically, the situation of the hash value collision can be easily recognized, so that the relay operation of the network relay device can be more efficient. As a comparative example of the method of using the address table FDB1 of FIG. 2, for example, a method of monitoring the procedure shift to step S107 of FIG. 3 on the time series and separately leaving (recording) the shift in a management memory or others as a log. By using such a method, it is relatively easy to keep such a log as recognizing the number of occurrence (a frequency of occurrence) of the hash value collision. However, if it is desired to know the ratio of collisions in the entry or the entry in which the collision has been caused, it is required to leave the entry itself in which the collision has been caused as a log. In this case, there may be such disadvantages that the processing for the registration of the address table is delayed or that the management memory or others requires a relatively large storage area for storing the log. Therefore, even compared with such a method, the method of using the address table FDB1 of FIG. 2 can obtain the beneficial effect.

Second Embodiment

Structure of Address Table (Modification Example [1])

Figure 6:
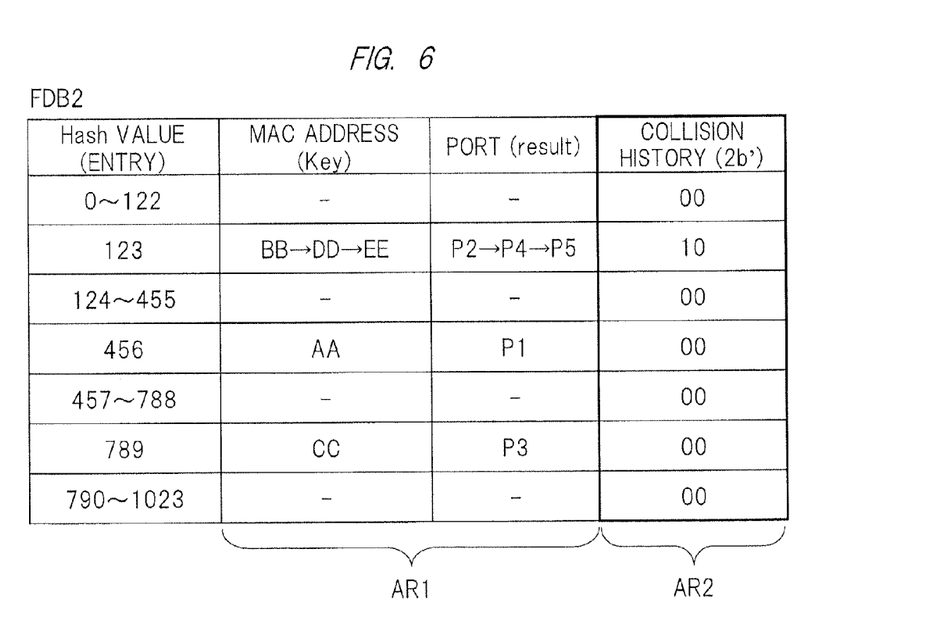
FIG. 6 is a schematic diagram illustrating a structure example of an address table of a network relay device according to a second embodiment of the present invention.

FIG. 6 is a schematic diagram illustrating a structure example of an address table of a network relay device according to a second embodiment of the present invention. The network relay device of the second embodiment includes a structure as illustrated in FIG. 1B, and is different from FIG. 2 in a structure of an address table FDB2. The address table FDB2 illustrated in FIG. 6 is different from the address table FDB1 of FIG. 2 in the structure of the second area AR2 of each entry. Other structures except for this are similar to those of FIG. 2, and therefore, detailed description will be omitted.

In FIG. 6, in the second area AR2 of each entry, information of a plurality of bits indicating the number of times of the hash value collision in the entry itself is registered as the second information indicating the hash value collision history. For example, in the example of FIG. 6, for an entry corresponding to a hash value of 123, the hash value collision has been caused twice, so that second information of "10" in binary is accordingly registered in the second area AR2. Here, for convenience, note that a case in which the overwriting and registration of the MAC address and the port is always performed in accordance with the hash value collision is exemplified. In this manner, compared with the case of FIG. 2, while the storage capacity of the address table is increased, the state of the hash value collision can be more recognized in detail. Note that such a structure as combining the second area AR2 of FIG. 2 and the second area AR2 of FIG. 6 can be adopted depending on cases.

Operation of Principal Part of Frame Processing Unit (Modification Example [1])

Figure 7:
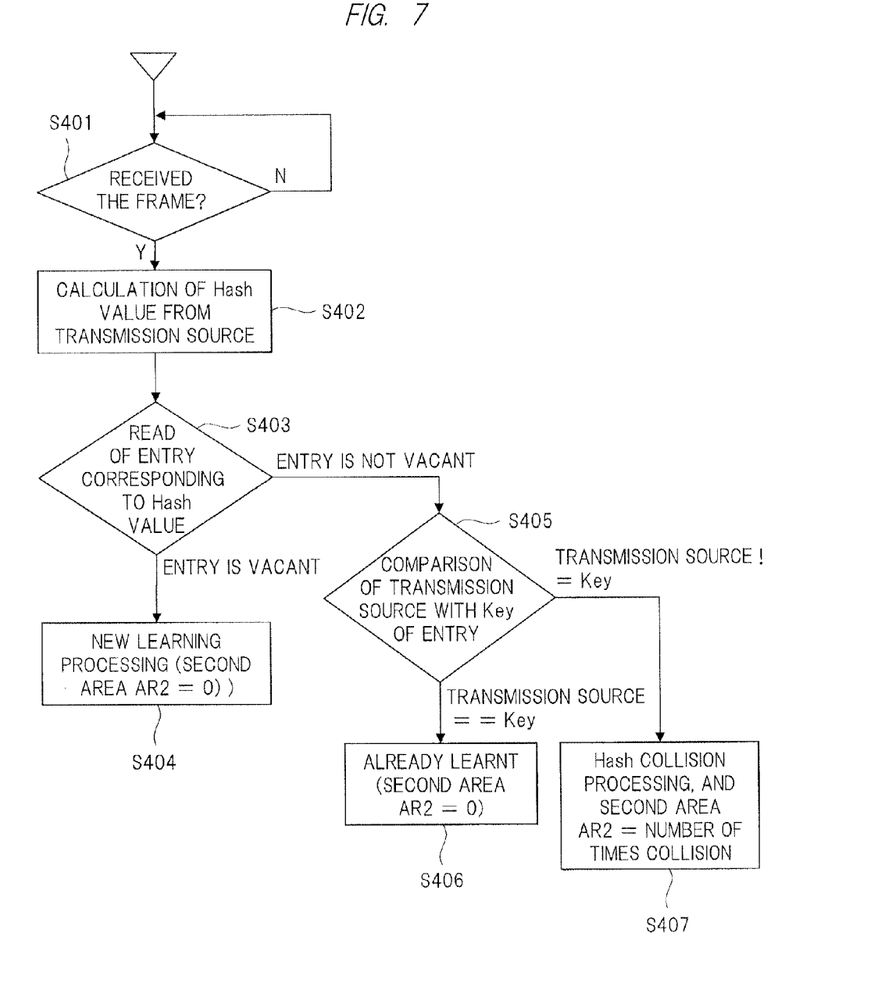
FIG. 7 is a flowchart illustrating an operation example of a principal part of a frame processing unit of the network relay device according to the second embodiment of the present invention.

FIG. 7 is a flowchart illustrating an operation example of a principal part of a frame processing unit of the network relay device according to the second embodiment of the present invention. In FIG. 7, the frame processing unit FLCTL executes processing from steps S401 to S406 whose processing contents are the same as the processing from steps S101 to S106 of FIG. 3 described above. However, if the transmission-source MAC address and the MAC address (Key) which has already been registered in the entry are different from each other at step S405, the frame processing unit FLCTL executes a processing different from the processing at step S107 of FIG. 3, at step S407.

At step S407, the frame processing unit FLCTL performs a predetermined collision processing as similar to step S107 of FIG. 3, but registers the number of times of the hash value collision in the second area AR2 as the second information as different from step S107. Specifically, the frame processing unit FLCTL increments the value of the second area AR2 which has been read at step S403 (by +1), and registers the result in the second area AR2.

Third Embodiment

Structure of Address Table (Modification Example [2])

Figure 8:
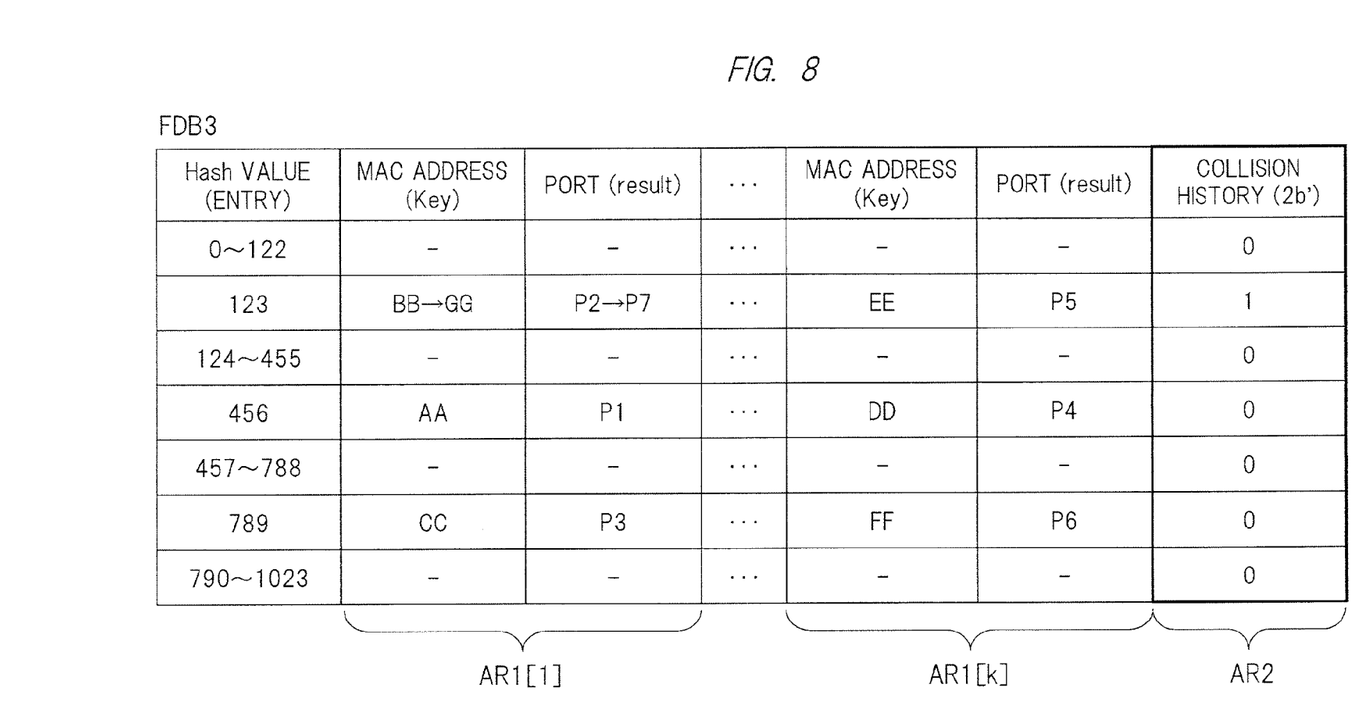
FIG. 8 is a schematic diagram illustrating a structure example of an address table of a network relay device according to a third embodiment of the present invention.

FIG. 8 is a schematic diagram illustrating a structure example of an address table of a network relay device according to a third embodiment of the present invention. The network relay device of the third embodiment includes a structure as illustrated in FIG. 1B, and is different from FIG. 2 in a structure of an address table FDB3. The address table FDB3 illustrated in FIG. 8 is different from the address table FDB1 of FIG. 2 in that each entry includes a plurality of first areas AR1 [1] to AR1 [k]. And, the second area AR2 is provided commonly to the plurality of first areas. Other structures except for this are similar to those of FIG. 2, and therefore, detailed description will be omitted.

As described with reference to FIG. 2 or others, in each of the plurality of first areas AR1 [1] to AR1 [k], first information indicating a relation between the plurality of ports and the MAC addresses existing beyond the plurality of ports is registered. That is, in each entry, a plurality of (here, different "k" pieces (k is an integer equal to or larger than 2)) of first information can be registered. In this manner, as long as the number of times of the hash value collision is in a range up to (k−1) times, it can be substantially regarded that the hash value collision is not caused.

Operation of Principal Part of Frame Processing Unit (Modification Example [2])

Also, the frame processing unit FLCTL performs the processing similar to that of FIG. 3 based on the address table FDB3 of FIG. 8. However, at step S103 of FIG. 3, the frame processing unit FLCTL reads the plurality of first areas AR1 [1] to AR1 [k] included in the entry corresponding to the hash value, and proceeds to step S105 if the first information has been registered in all of the first areas. At step S105, if a MAC address different from the transmission-source MAC address has been registered in all of the plurality of first areas, the frame processing unit FLCTL proceeds to step S107. Then, at step S107, the frame processing unit FLCTL performs a predetermined collision processing, and besides, registers the second information indicating the hash value collision history in the second area AR2.

In this manner, the probability of occurrence of the hash value collision can be substantially reduced for each entry, and besides, the state of the occurrence of the hash value collision if it is caused can be easily recognized as similar to the first embodiment, and therefore, the relay operation of the switch device can be more efficient. Here, note that the second information of the second area AR2 has one bit. However, of course, the second information can have a plurality of bits as illustrated in FIG. 6.

Fourth Embodiment

Structure of Address Table (Modification Example [3])

Figure 9:
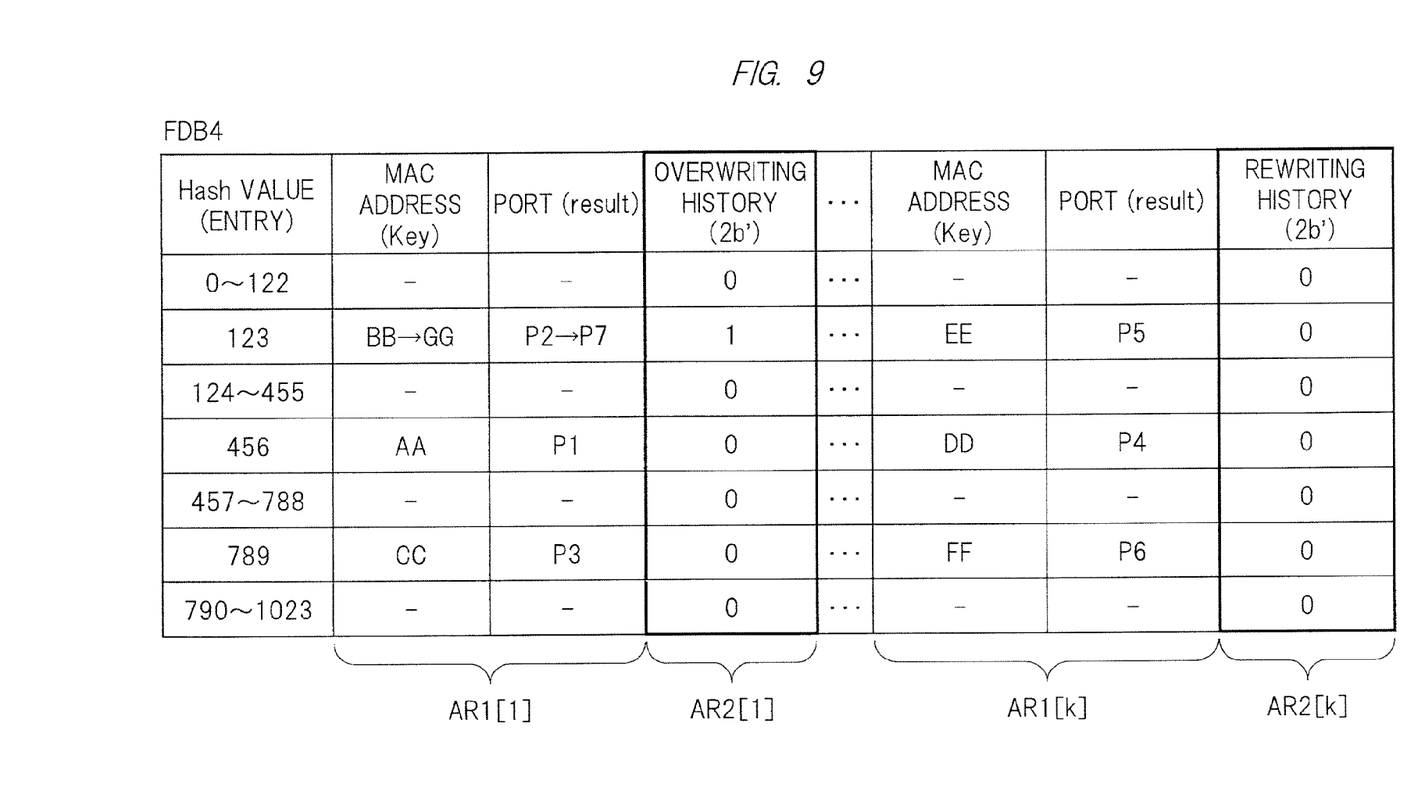
FIG. 9 is a schematic diagram illustrating a structure example of an address table of a network relay device according to a fourth embodiment of the present invention.

FIG. 9 is a schematic diagram illustrating a structure example of an address table of a network relay device according to a fourth embodiment of the present invention. The network relay device of the fourth embodiment includes a structure as illustrated in FIG. 1B, and is different from FIG. 8 in a structure of an address table FDB4. The address table FDB4 illustrated in FIG. 9 is different from the address table FDB3 of FIG. 8 in that each entry includes second areas AR2 [1] to AR2 [k] corresponding to the plurality of first areas AR1 [1] to AR1 [k] and in that the second information is registered in the second area if the overwriting and registration of the first information is performed in the corresponding first area. Other structures except for them are similar to those of FIG. 8, and therefore, detailed description will be omitted.

Operation of Principal Part of Frame Processing Unit (Modification Example [3])

Also, the frame processing unit FLCTL performs the processing similar to that of FIG. 3 based on the address table FDB4 of FIG. 9. However, at step S103 of FIG. 3, the frame processing unit FLCTL reads the plurality of first areas AR1 [1] to AR1 [k] included in the entry corresponding to the hash value, and proceeds to step S105 if the first information has been registered in all of the first areas. At step S105, if a MAC address different from the transmission-source MAC address has been registered in all of the plurality of first areas, the frame processing unit FLCTL proceeds to step S107. Then, at step S107, the frame processing unit FLCTL performs a predetermined collision processing. As a result, if the first information is overwritten and registered in a predetermined first area in the entry, the frame processing unit FLCTL registers second information indicating an execution history of the overwriting and registration in the second area corresponding to the first area.

In this manner, in addition to various effects described in the third embodiment, it can further be determined in what first area of the plurality of first areas included in each entry the overwriting and registration has been caused and in what first area thereof the overwriting and registration has not been caused. As one example, when the first information is registered in a plurality of first areas, if there is such a system that the overwriting and registration is performed in the first area having the first information received the earliest, the plurality of first areas are imbalanced so as to provide the first area in which the overwriting and registration is actually performed in some cases. In such a case, for example, the first information received at a high frequency from this imbalanced situation can be determined.

In the foregoing, the invention made by the inventor has been concretely described based on the embodiments. However, the present invention is not limited to the foregoing embodiments and various modifications and alterations can be made within the scope of the present invention. For example, the above-described embodiments have been explained for easily understanding the present invention, but are not always limited to the ones including all structures explained above. Also, a part of the structure of one embodiment can be replaced with the structure of the other embodiment, and besides, the structure of the other embodiment can be added to the structure of one embodiment. Further, the other structure can be added to/eliminated from/replaced with a part of the structure of each embodiment.

For example, the first to third embodiments have the structure that the second information is registered in the second area when the hash value collision is caused. However, as similar to the fourth embodiment, the structure may be provided so that the second information is registered in the second area when the hash value collision is caused, and besides, the first information is overwritten and registered in the first area.

What is claimed is:

1. A network relay device comprising:
   a plurality of ports;
   an address table having a plurality of entries; and
   a frame processing unit which relays a frame to/from the plurality of ports based on the address table,
   wherein each of the plurality of entries includes:
   a first area in which first information is registered, the first information indicating a relation between the plurality of ports and MAC addresses existing beyond the plurality of ports; and
   a second area in which second information, indicating a collision history of a hash value in an entry in the address table, is registered, and
   in learning a transmission-source MAC address of a frame received at any of the plurality of ports, the frame processing unit calculates the hash value by using the transmission-source MAC address, and registers the second information in the second area if a MAC address different from the transmission-source MAC address has been registered in the first area of an entry corresponding to the hash value,
   the network relay device further comprising a managing unit which reads the second area of each of the plurality of entries in accordance with a request from a user, extracts an entry having the second region in which the second information is registered, and notifies the user of the extracted entry; and
   the managing unit further calculates a ratio of entries having the second area in which the second information is registered from among the plurality of entries in accordance with a request from a user, and notifies the user of the calculated ratio.

2. The network relay device according to claim 1, wherein the second information is information of one bit.

3. The network relay device according to claim 2, wherein each of the plurality of entries further includes a plurality of the first areas, and
the frame processing unit registers the second information in the second area if a MAC address different from the transmission-source MAC address has been registered in all of the plurality of first areas included in an entry corresponding to the hash value.

4. The network relay device according to claim 1, wherein the second information is information of a plurality of bits indicating the number of times of hash value collision in an entry itself.

* * * * *